(12) United States Patent
Smith et al.

(10) Patent No.: US 8,631,782 B2
(45) Date of Patent: Jan. 21, 2014

(54) ACTIVE COMPRESSION RATIO MODULATION THROUGH INTAKE VALVE PHASING AND KNOCK SENSOR FEEDBACK

(75) Inventors: James Donald Smith, Ann Arbor, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 547 days.

(21) Appl. No.: 12/196,572

(22) Filed: Aug. 22, 2008

(65) Prior Publication Data

US 2010/0049420 A1  Feb. 25, 2010

(51) Int. Cl.
*F01L 1/34* (2006.01)
*F02P 5/00* (2006.01)

(52) U.S. Cl.
USPC .................................. 123/406.16; 123/90.15

(58) Field of Classification Search
USPC ............ 123/435, 90.15, 90.16, 90.17, 90.18, 123/406.16, 406.21, 406.29, 48 R, 48 B, 123/406.23; 73/35.01; 701/111
See application file for complete search history.

(56) References Cited

U.S. PATENT DOCUMENTS

| | | | |
|---|---|---|---|
| 5,123,388 A * | 6/1992 | Kanesaka | 123/316 |
| 6,135,086 A * | 10/2000 | Clarke et al. | 123/316 |
| 6,553,949 B1 * | 4/2003 | Kolmanovsky et al. | 123/48 B |
| 6,557,526 B1 * | 5/2003 | Hoshino | 123/406.26 |
| 6,999,866 B2 * | 2/2006 | Noda | 701/111 |
| 7,437,233 B2 * | 10/2008 | Yasui et al. | 701/102 |
| 7,484,498 B2 * | 2/2009 | Hitomi et al. | 123/406.45 |
| 2005/0087155 A1 * | 4/2005 | Kikori | 123/78 C |
| 2006/0016407 A1 * | 1/2006 | Miyanoo et al. | 123/90.15 |
| 2006/0107924 A1 * | 5/2006 | Miyanoo et al. | 123/406.19 |
| 2006/0169246 A1 * | 8/2006 | Asai | 123/305 |
| 2007/0227503 A1 * | 10/2007 | Hitomi et al. | 123/406.45 |
| 2007/0234990 A1 * | 10/2007 | Shiino et al. | 123/179.16 |
| 2007/0255487 A1 * | 11/2007 | Etou et al. | 701/105 |
| 2008/0092834 A1 * | 4/2008 | Stein et al. | 123/90.15 |
| 2008/0228375 A1 * | 9/2008 | Ashida et al. | 701/103 |

* cited by examiner

*Primary Examiner* — Stephen K Cronin
*Assistant Examiner* — Sizo Vilakazi

(57) ABSTRACT

An internal combustion engine includes a piston reciprocable within a cylinder, a phase controllable valvetrain configured to alter the effective compression ratio of the engine, and a knock sensor. A method for controlling the engine includes controlling the valvetrain to a first effective compression ratio whereat knock is detectable by the knock sensor and thereafter controlling the valvetrain to reduce the effective compression ratio to a point whereat knock is no longer detectable.

9 Claims, 2 Drawing Sheets

ACTIVE COMPRESSION RATIO MODULATION THROUGH INTAKE VALVE PHASING AND KNOCK SENSOR FEEDBACK

TECHNICAL FIELD

This disclosure relates to methods and systems useful in operating internal combustion engines.

BACKGROUND

One of the inherent features of modern internal combustion (IC) engines is that their operating cycle includes a compression stroke, in which a mixture comprising air and a hydrocarbon or other fuel is compressed in a cylindrical volume prior to its ignition, from which ignition is developed a force that is advantageously used to propel one or more pistons. In a typical internal combustion engine, one or more pistons are connected to a crankshaft that is rotably disposed in an engine block, and the repeated, controlled ignition of compressed air/fuel mixtures serve as the main motive means of propulsion for causing rotation of the engine's crankshaft.

By its nature, the combustion of compressed air/fuel mixtures permits some degree of freedom in engineering selection of the degree to which the air/fuel mixture to be combusted is compressed. Compression ratio is used to refer to the degree which an air/fuel mixture is compressed prior to its combustion. Generally, there is a mechanical compression ratio, which represents the theoretical maximum possible compression ratio. The mechanical compression ratio is derived from the ratio of the combined volume within the cylinder and combustion chamber in which a piston is disposed when the piston is at its bottom dead center ("BDC") position in a cylinder bore, versus the combined volumes within the same cylinder and combustion chamber when the piston is at its top dead center ("TDC") position. Mechanical compression ratios on the order of between about 8:1 to about 12:1 have been employed in spark-ignition engines employing gasolines as a fuel.

The effective compression ratio or dynamic compression ratio, on the other hand, is often somewhat less than the mechanical compression ratio. This discrepancy is due, among other things, to such factors as the volumetric efficiency of an IC engine, valve timing, engine r.p.m., air temperature, and inertial forces inherent in a flowing mass of air/fuel mixture. Effective compression ratios on the order of between about 7:1 to about 10:1 have been achieved in IC engines.

A typical IC engine includes a valve train, which includes a camshaft that by virtue of its rotation causes the opening and closing of one or more intake and exhaust valves associated with a cylinder on the IC engine. Camshafts may be rotably disposed within an engine block, or may be rotably mounted atop or in a cylinder head. Engine configurations having a single camshaft to actuate both intake and exhaust valves are known, as are engines which employ a single camshaft for operating one or more intake valves only, with a separate camshaft being used to operate one or more exhaust valves only. In any event, the rotation of the camshaft(s) are often mechanically coupled to the rotation of the engine's crankshaft, typically through a timing chain or by means of one or more timing belts. It is generally desirable for an engine's valve timing to have both intake and exhaust valves substantially closed during the engines compression stroke, to enable compression of the air/fuel mixture present in the cylinder under consideration. Modifications to camshaft profiles have been made which sometimes provide for an intake valve to not be completely closed when the piston begins its upward travel in a cylinder during a compression stroke. Additionally, some camshafts exist which permit for a cylinder's exhaust valve to remain open after the piston has reached TDC on an exhaust stroke. The selection by a camshaft designer of preferred precise timing events such as the angular position of the crankshaft within the engine block expressed as degrees of rotation of the crankshaft during a single engine cycle when an intake valve or exhaust valve begins to open or close is fairly specific to a given engine design, taking into account all relevant factors relating to the engine's design, intended use, and anticipated service range of r.p.m. Cam timing events include intake and exhaust valve opening and closing events, and are typically expressed as occurring using degrees of crankshaft rotation prior to the event. In some embodiments, these are expressed at zero lift, and in alternate embodiments these may be expressed at any desired specified amount of valve lift off its corresponding seat. Additionally, cam centerline, lobe separation, valve lift, duration as measured at a specified amount of lift, overlap, and valve timing advance are other variables at the disposal of a camshaft designer and automotive engineer.

Given the variety of engine sizes and end-use requirements for IC engines, it has not been possible to this day to provide a single camshaft profile that is suitable for the needs of all IC engines; accordingly, a wide range of camshaft profiles and timing events are in popular use. Often, camshaft grinds which are optimal for high power output perform poorly with respect to fuel consumption, and camshaft grinds which perform well respecting fuel consumption do not deliver the maximum possible torque output for a given engine configuration. Thus, a camshaft selected for a given engine design and configuration often represents a compromise between these two factors. The trade-off between power and economy mentioned above and other constraints including engine emissions, have provided some limitations on the versatility of the operation of engines, particularly those operated using fuels of inconsistent chemical composition over the useful service life of a given engine.

SUMMARY

An internal combustion engine includes a piston reciprocable within a cylinder, a phase controllable valvetrain configured to alter the effective compression ratio of the engine, and a knock sensor. A method for controlling the engine includes controlling the valvetrain to a first effective compression ratio whereat knock is detectable by the knock sensor and thereafter controlling the valvetrain to reduce the effective compression ratio to a point whereat knock is no longer detectable.

BRIEF DESCRIPTION OF THE DRAWINGS

One or more embodiments will now be described, by way of example, with reference to the accompanying drawings, in which.

DETAILED DESCRIPTION

Figure 1:
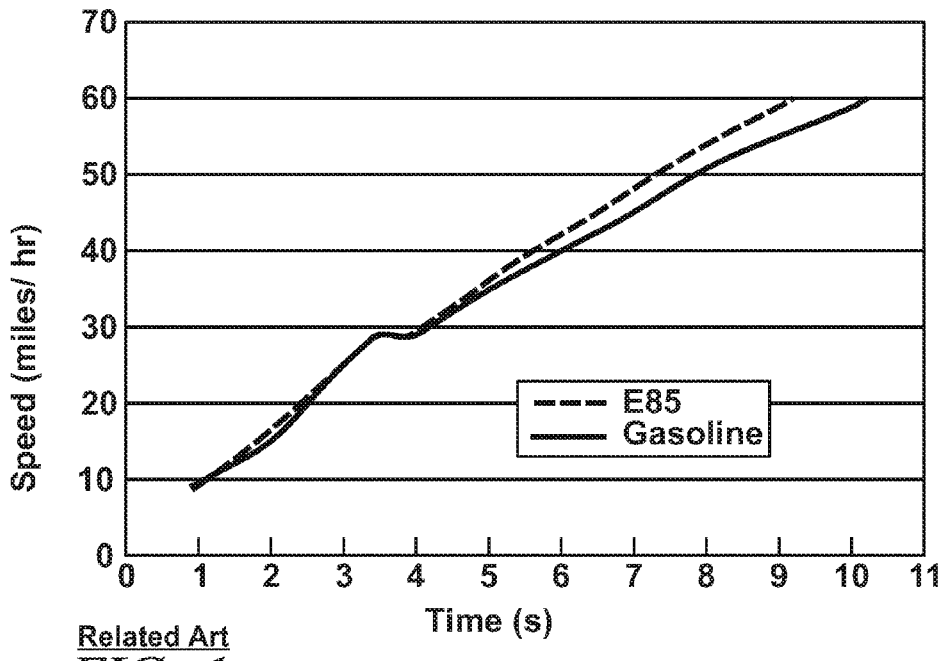
FIG. 1 shows differences in performance of a motorized vehicle having an engine operated on different fuel, in accordance with the present disclosure.
Figure 2:
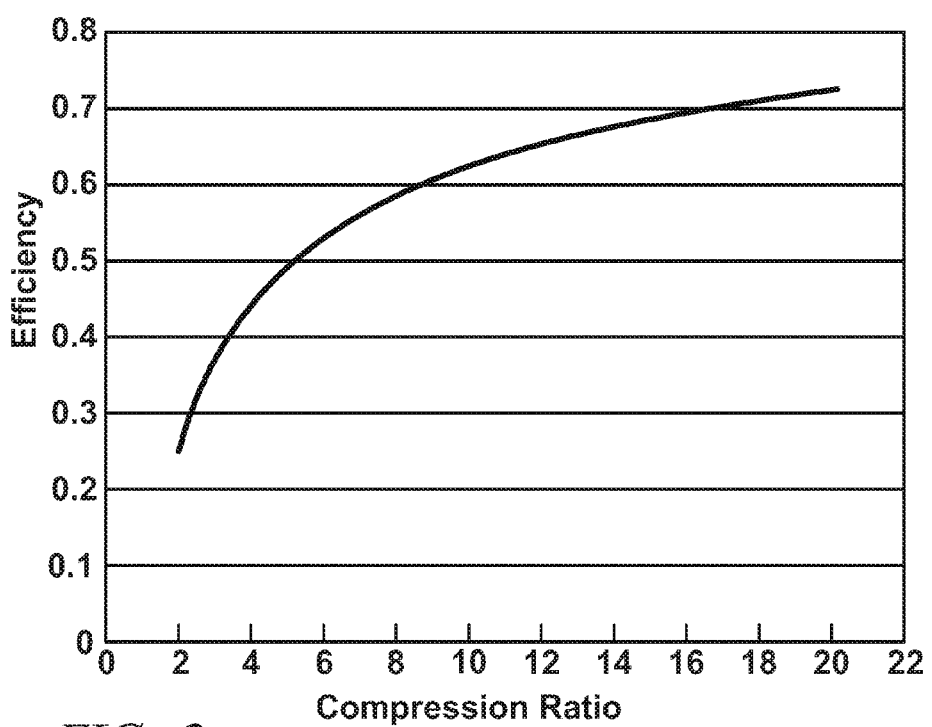
FIG. 2 graphically depicts a curve of typical fuel conversion efficiency for a constant-volume 4-stroke engine cycle as a function of compression ratio, in accordance with the present disclosure.

Referring now to the drawings, wherein the showings are for the purpose of illustrating certain exemplary embodiments only and not for the purpose of limiting the same, FIG. 1 shows differences in performance from 0 to 60 m.p.h. of a vehicle equipped with a Saab 9.5 BioPower engine, as detailed in SAE publication 2007-01-3994. From this it is evident that the fuel designated as "E85" has the capability of providing performance increases relative to the same engine/vehicle configuration when operated using standard gasoline fuels. The knock resistance of E85 is higher than gasoline, which enables engines that are specifically designed to operate on E85 to be provided with higher dynamic compression ratios, or higher levels of boost on engines equipped with provisions enabling forced-induction, including supercharged engines and turbocharged engines. As shown in FIG. 2, typical of an engine operated under conditions in which the excess air ratio is about 1.4, higher dynamic compression ratios can generally be equated with higher thermodynamic energy conversion efficiencies. However, while E85 may be available in some geographical areas, it is not in standard use. This means that engines in current popular use which are designed to run on both E85 and gasolines are unable to take maximum advantage of the combustion properties of E85, and that dedicated E85 engines do not run well on gasoline, due to knocks, which makes the operation of engines dedicated to run strictly on E85 less practical.

Knock events or detonations as they sometimes are called, generally occur undesirably when an air/fuel mixture autoignites prior to completion of the normal flame-propagating combustion event. Causes of knocks can include an increase in the load placed on an operating engine, and changes in ambient conditions or fuel. Several factors come into play, with fuel composition and dynamic compression ratio being key determinants. In one embodiment, this disclosure provides a method useful for providing performance versatility to a motorized vehicle that is operated over time on fuels of varied combustion properties. Motorized vehicles suitable for use in a method according to this disclosure generally may include a microprocessor and an IC engine. Included within the class of IC engines suitable for use in a method according to this disclosure are IC engines which comprises an engine block having at least one cylinder bore, a crankshaft rotably disposed in the engine block, and at least one piston connected to the crankshaft, with the piston being slidably disposed within a cylinder bore. There is a cylinder head attached to the engine block, which cylinder head comprises a combustion chamber, an intake valve, and an exhaust valve. A rotably-disposed camshaft is provided, being in effective mechanical contact with at least one of the intake and exhaust valves, sufficient, by virtue of rotation of the camshaft, to cause at least one valve to have an opening event and a closing event, each of which events occur repeatedly in periodic fashion during continued rotation of the crankshaft within the engine block. In preferred embodiments, an engine that is to be operated in accordance with this disclosure is provided with a high mechanical compression ratio, on the order of any compression ratio between about 13:1 to about 16:1, including all compression ratios and ranges of compression ratios therebetween.

A method according to one embodiment of the disclosure includes first operating the engine under a first set of operating conditions which include a first engine r.p.m. and a first load, wherein the opening event and closing event of at least one of the intake and exhaust valves begins to occur after a first amount of rotation and a second amount of rotation, respectively, of the crankshaft in the engine block, thus defining an initial opening angular position and initial closing angular position of the crankshaft with respect to said opening event and closing event of the at least one valve. The engine is next operated under a second set of operating conditions which include at least one of a second engine r.p.m. (different from the first, by any amount) and a second load (different from the first, by any amount), and wherein the opening event and closing event of the at least one valve begins to occur at the same initial opening angular position and initial closing angular position of the crankshaft in the engine block as occurred during engine operation under the first set of operating conditions. However, in one embodiment the second set of operating conditions are sufficient to enable a knock to occur in at least one cylinder of the engine. In another one embodiment the first set of operating conditions are sufficient to enable a knock to occur in at least one cylinder of the engine. The knock is detected using a conventional knock-sensor or functionally-equivalent device, which is capable of converting all or a portion of the shock wave resulting from a knock event into an electrical signal; for this purpose, knock sensors are known in the art, including as one non-limiting example, knock sensors available from General Motors under part number 10456288. The electrical signal from the knock sensor is subsequently provided to the vehicle's microprocessor, which microprocessor is programmed to issue a command to a portion of the engine control system to cause an alteration in the point at which at least one of the opening event and closing event of the at least one valve begins to occur with respect to the angular position of the crankshaft in the engine block during its continued rotation to be different from at least one of the respective initial opening angular position and initial closing angular position, to provide for at least one of the events of the opening and closing of said at least one valve to occur when the crankshaft is at a different angular position than the crankshaft was at when the knock occurred. This may be an advancement or a retardation of at least one valve timing event. For cases where all exhaust valves on an engine or bank of cylinders are controlled by a single camshaft, the exhaust valve timing may thus be controlled independently of the intake valve timing. For cases where all intake valves on an engine or bank of cylinders are controlled by a single camshaft, the intake valve timing may thus be controlled independently of the intake valve timing. In one embodiment, the dynamic compression ratio of at least one engine cylinder is effectively lowered by alteration of at least one valve timing event.

By a method according to this disclosure, an engine's overall average dynamic compression ratio for all cylinders can be selectively modified to conform to the maximum amount of compression permissible just short of that at which undesirable autoignition occurs for a given fuel, thus providing increases in thermodynamic efficiencies above and beyond those possible when spark advance is employed as the sole means of controlling detonation in IC engines. However, control of spark advance as a means of inhibiting engine knock may also be used when operating an engine according to this disclosure. Knock is a limiting factor in engine design; however, part-load conditions can tolerate higher compression ratios and it is thus beneficial according to one embodiment of this disclosure to operate an IC engine under conditions at which no knocks occur, and then to ramp up the dynamic compression ratio by altering valve timing events such as opening and closing of intake and/or exhaust valves until the point is reached where the engine just begins to experience knock, and then to cause a reduction in the dynamic compression ratio which is sufficient that knock no longer occurs for a given set of operating conditions demanded by an operator of a motorized vehicle comprising an engine system operated according to one or more embodiments herein described. In alternate embodiments, the dynamic compression ratio is decreased further below that at which knock no longer occurs for a given set of operating conditions. In one embodiment, the intake valve is opened any amount of crankshaft rotation between about 0 degrees and about 100 degrees, including all degrees and ranges therebetween, earlier during the intake stroke than the time it was opened with respect to crankshaft angular position when knock just started to occur for a given set of operating conditions, which may include load, throttle position and engine r.p.m. In another embodiment, the intake valve is closed any amount of crankshaft rotation between about 0 degrees and about 100 degrees, including all degrees and ranges therebetween, later during the compression stroke than the time it was closed with respect to crankshaft angular position when knock just started to occur for a given set of operating conditions, which may include load, throttle position and engine r.p.m. Similarly, timing events for exhaust valves may according to this disclosure be independently or concomitantly altered by the same, more, or less amounts of crankshaft rotation during their cyclings between an open and a closed position. Thus, valve overlap may be effectively controlled by the teachings of this disclosure for embodiments in which timing events for exhaust valves and intake valves are provided by separate camshafts. For convenience, timing events are made in reference to a selected cylinder with its piston being in the top dead center position, with the piston selected as a reference being considered in TDC position when it is at the top of its travel in its cylinder bore and intake and exhaust valves associated with that piston are closed, as is known in the art.

Variable-timing valvetrains and methods for controlling valve timing are known in the art to include, e.g., mechanical and hydraulically controlled cam phasers, variable lift control including, e.g., multi-lobed cam arrangements and multi-step lift devices, and electrically and hydraulically controlled continuously variable valve control mechanisms. In one embodiment, this disclosure provides systems useful for propelling a motorized vehicle, which systems comprise a piston-driven internal combustion engine having at least one cylinder, a rotably-disposed crankshaft, and a variable-timing valvetrain comprising at least one intake valve and at least one exhaust valve, wherein the at least one valve is configured to have opening and closing events which recur periodically during continued rotation of the crankshaft during operation of the engine. There is also a knock sensor disposed in sufficient proximity to the at least one cylinder to detect a knock, and in a preferred embodiment the knock sensor provides an electrical signal in response to a detected knock. A microprocessor is provided and configured to receive the electrical signal, the microprocessor being in effective electro-mechanical contact with the variable-timing valvetrain sufficiently to alter valve timing events in response to electrical signals received from the knock sensor.

Figure 3:
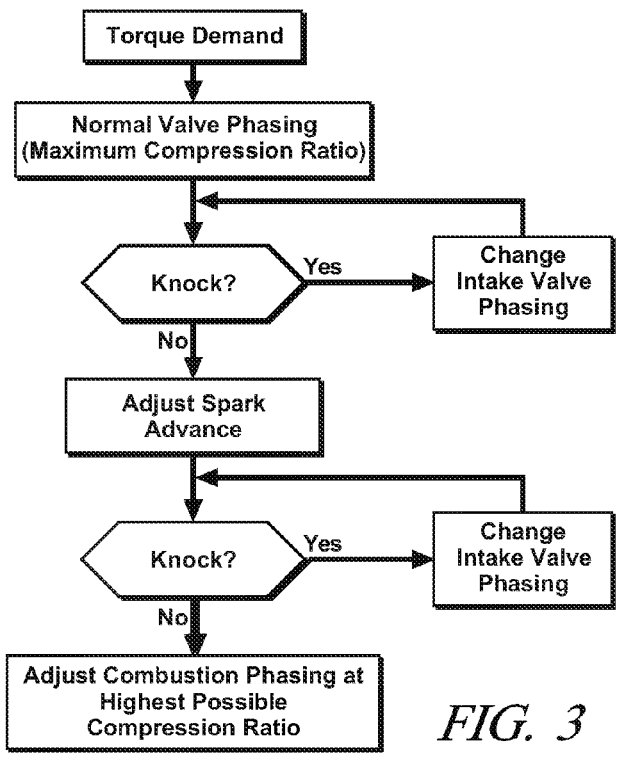
FIG. 3 is a representation of a decision-making algorithm useful in one embodiment of the present disclosure.

FIG. 3 shows a decision-making algorithm which is useful according to one embodiment of the present disclosure. At the beginning of this algorithm, the operator of a motorized vehicle equipped with an engine that is configured to operate in accordance with this disclosure makes a torque request, which in one embodiment may comprise depressing an accelerator pedal. The hydrocarbon or oxygenate-fueled engine employed may have a relatively high compression ratio, on the order of about 12:1 and the camshaft and valve timing are in a particular first state of operation, having well-defined events of valve openings and closings, lifts, durations at specified lifts, such as 1.25 millimeters or any other selected amount of lift, and overlap. Following the torque request, the on-board microprocessor is programmed to detect a signal from a knock sensor. If knock is detected, the microprocessor commands the valvetrain to effectively lower the dynamic compression ratio by altering at least one valve timing event. If no signal indicating knock is received, spark advance is effected. The microprocessor then again attempts to detect knock, and if detected, the microprocessor commands the valvetrain to effectively lower the dynamic compression ratio. If no signal indicating knock is received, then the microprocessor commands the valvetrain to effectively increase the dynamic compression ratio. By such a scheme, feedback from the knock sensor is used to maximize dynamic compression ratio while maintaining ideal combustion phasing.

Figure 4:
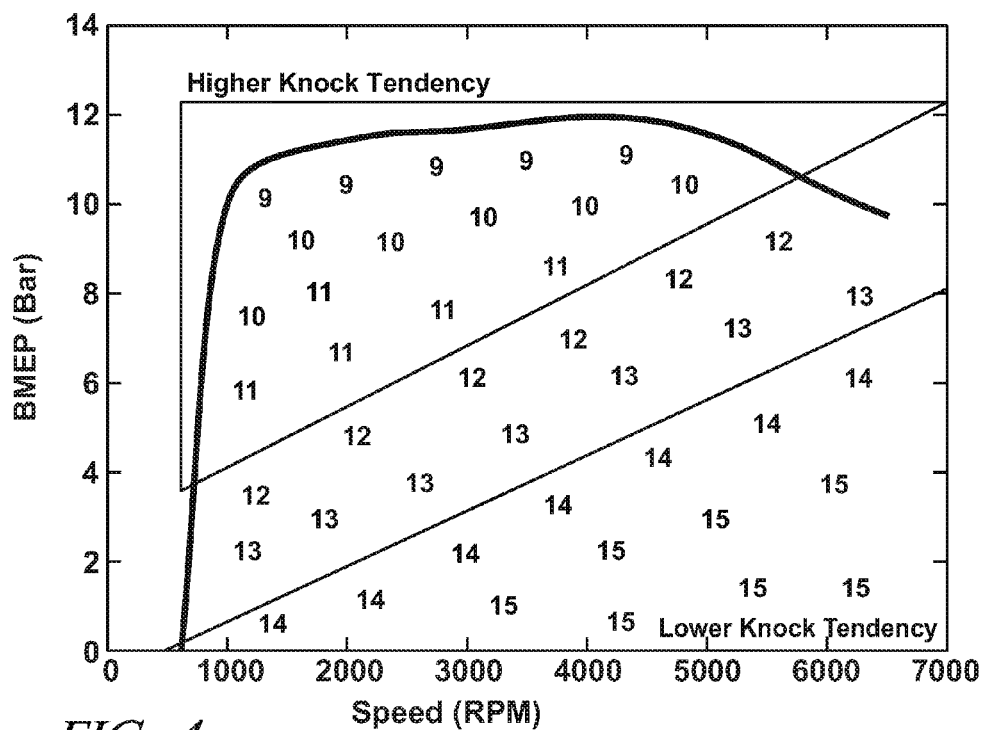
FIG. 4 is a depiction of an exemplary compression ratio variation map of an engine operated in accordance with the present disclosure.

In a preferred embodiment, spark timing is adjusted to minimum advance for best torque ("MBT") from data generated during an engine calibration carried out prior to operating the engine in its intended environment. Through such a process, a compression ratio variation map of an engine can be generated, such as that depicted by way of example and not delimitive of this disclosure, in FIG. 4 showing the brake mean effective pressure in bar as a function of engine r.p.m. Over most of this speed-load map, engines operated on gasoline are not typically knock-limited, and combustion phasing determines the maximum useful spark advance. At high load regions of the speed-load map, normal gasoline engines are knock-limited and combustion phasing is retarded. Fixed compression ratios dictate a balance between combustion phasing and compression ratio over the entire speed-load range. According to this disclosure, the effective compression ratio can be reduced to allow for combustion phasings which approach the ideal case, without encountering knocks, thus providing a heretofore unattainable level of trade-off between phasing and compression ratio at each speed/load point, which is readily determinable during engine calibration. For the same engine operated using E85, higher dynamic compression ratios can generally be tolerated throughout the operating range. Current production engines do not enable advantage to be taken of this and effectively levy a thermodynamic penalty on gasoline engines operated at low loads or on E85 fuel. Adjusting compression ratio to the knock limit as provided herein, yields higher overall efficiencies and improved performance for engines, regardless of whether the same engine is operated when fueled with alternative fuels such as E85, or conventional motor fuels, including gasolines.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an internal combustion engine including a piston reciprocable within a cylinder, a phase controllable valvetrain operable on intake and exhaust valves configured to alter the effective compression ratio of the engine, controllable spark timing, and a knock sensor, the method comprising:

in response to an operator torque request, monitoring the output of the knock sensor;

only when knock is detected by the knock sensor, performing a first control comprising decreasing the effective compression ratio until knock is not detected;

only when knock is not detected, advancing spark timing for best torque; and subsequent to said advanced spark timing, performing a second control comprising decreasing the effective compression ratio when knock is detected and increasing the effective compression ratio when knock is not detected.

2. The method for controlling an internal combustion engine as claimed in claim 1 wherein advancing spark timing for best torque includes knock being subsequently detectable and controlling the valvetrain to further reduce the effective compression ratio to a point whereat knock is no longer detectable.

3. The method for controlling an internal combustion engine as claimed in claim 1 wherein the engine has a mechanical compression ratio of greater than about 12:1.

4. Method for operating a piston-driven internal combustion engine having at least one cylinder, comprising:

starting and operating said engine under conditions wherein said at least one cylinder has a first dynamic compression ratio;

altering valvetrain timing of at least one of a respective intake valve and a respective exhaust valve corresponding to said at least one cylinder to provide said at least one cylinder with a second dynamic compression ratio that is higher than said first dynamic compression ratio;

operating said engine under conditions which cause a knock to occur in said at least one cylinder;

detecting said knock;

in response to detecting said knock, subsequently altering valvetrain timing of at least one of said respective intake valve and said respective exhaust valve corresponding to said at least one cylinder to provide a decrease in dynamic compression ratio of said at least one cylinder until knock is not detected;

only when knock is not detected, advancing spark timing for best torque.

5. A method according to claim 4 wherein said decrease in dynamic compression ratio is an effective amount of decrease to prevent knock recurrence.

6. A method according to claim 4 wherein subsequently altering valve timing includes at least one of advancing intake valve opening, and retarding intake valve closing.

7. A method according to claim 4 wherein said altering valve timing of said at least one of said respective intake valve and said respective exhaust valve corresponding to said at least one cylinder to provide an increase in dynamic compression ratio results in the dynamic compression ratio achieving a pre-determined substantially-discrete level of compression.

8. A method according to claim 4, further comprising:

controlling the spark timing to effect a minimum advance for best torque and including advancing and retarding the spark timing to achieve the best torque without achieving knock.

9. A method according to claim 1 wherein said engine has a mechanical compression ratio of any compression ratio in the range of between about 12:1 to about 18:1, including all compression ratios and ranges of compression ratios therebetween.

* * * * *